United States Patent [19]
Hage

[11] 3,738,462
[45] June 12, 1973

[54] AUTOMATIC ADJUSTER FOR CLUTCH AND BRAKE

[75] Inventor: Joseph C. Hage, New Shrewsbury, N.J.

[73] Assignee: The Singer Company, New York, N.Y.

[22] Filed: May 26, 1972

[21] Appl. No.: 257,293

[52] U.S. Cl............ 192/18 R, 192/111 A, 188/71.9
[51] Int. Cl............................................. F16d 67/02
[58] Field of Search....................... 192/18 R, 111 A

[56] References Cited
UNITED STATES PATENTS

| | | | |
|---|---|---|---|
| 2,280,355 | 4/1942 | Spase et al......................... | 192/11 A |
| 2,680,505 | 6/1954 | Halberg........................... | 192/111 A |
| 3,387,157 | 6/1968 | Cook et al. ........................ | 192/18 R |

*Primary Examiner*—Benjamin W. Wyche
*Attorney*—Marshall J. Breen et al.

[57] ABSTRACT

A power transmitting device having an electric motor driven shaft and a clutch type flywheel mounted on one end of the shaft. A bellcrank mounted braking member is located opposite to the clutch surface of the flywheel and spaced therefrom. An adjusting screw having a ratchet wheel secured thereto varies the position of the bellcrank. A clutch disk having friction facings on each side thereof is positioned intermediate the flywheel and the braking member and is mounted on one end of a power take-off shaft slidable by means of a pivotably mounted actuating lever so as to engage selectively a first friction facing of the clutch disk with the flywheel or to engage the second friction facing of the disk with the braking member. A pawl member is secured to the actuating lever and when the actuating lever is pivoted the pawl can turn the ratchet wheel to move the braking member toward the flywheel when wear on the friction facings has caused the clearance between the flywheel and the clutch to exceed a preselected amount proportional to the pitch of the ratchet wheel teeth.

12 Claims, 4 Drawing Figures

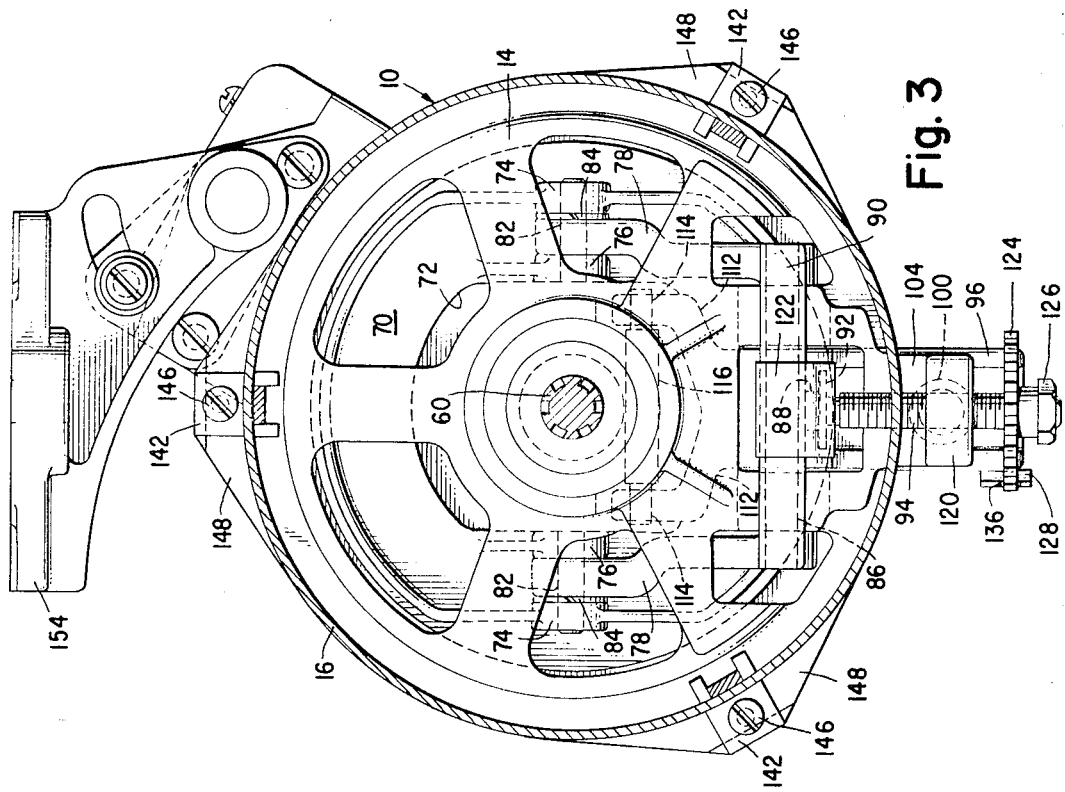
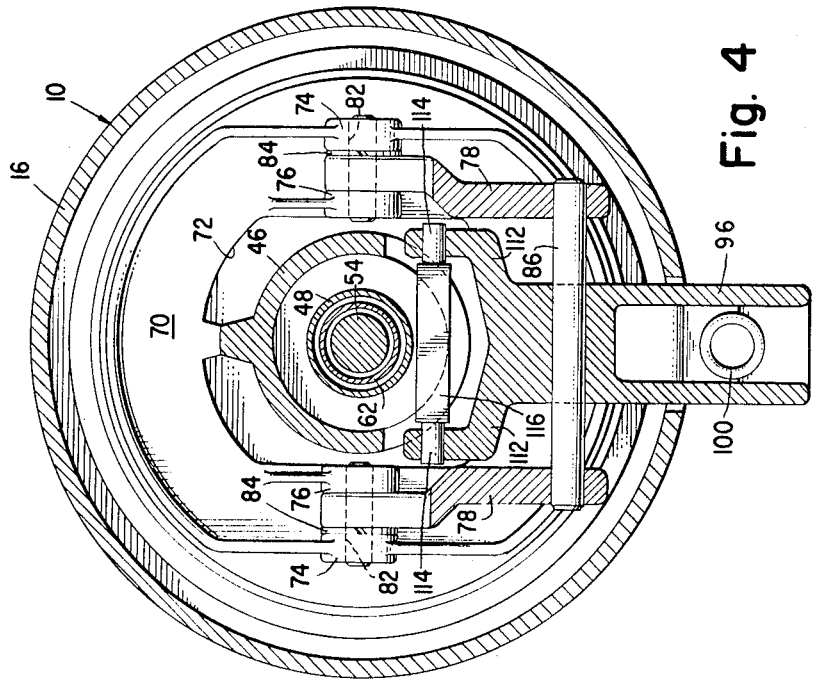

AUTOMATIC ADJUSTER FOR CLUTCH AND BRAKE

BACKGROUND OF THE INVENTION

This invention relates to power transmitting devices of the clutch brake type and more specifically to an adjusting mechanism which automatically adjusts the clearance between the brake and the clutch to compensate for wear of the clutch brake surfaces.

Power transmitting devices of the clutch brake type (also known as clutch-brake driving devices) are well known and used extensively in the industrial sewing arts for transmitting power intermittently from a rotating electric motor to a pulley for driving a sewing machine arm shaft. These devices allow the operator intermittently to drive the sewing machine for the required sewing operations and to stop the machine without stopping the motor when non-sewing manipulations are required. This is generally effected by depressing a foot treadle to actuate a pivotable lever which in turn moves a driven clutch member into engagement with a driving clutch member mounted on the motor shaft. Release of the treadle disengages the driven clutch member from the driving clutch member and engages it with a brake member to thereby stop the sewing operations. A power transmitting device of this type is disclosed in U.S. Pat. No. 3,387,157 which is assigned to the common assignee of the present invention.

The one problem with power transmitting devices of this type is that they require preiodic manual adjustment to compensate for clutch-brake wear. For example, the device disclosed in the above said United States patent is provided with a means to manually adjust for such wear; however, in many installations this adjustment is neglected thereby causing increasingly longer treadle travel with resulting inefficiency and operator fatigue. This takes place so gradually that the operator only realizes the increased travel when it begins seriously to effect her work, although the gradual deterioration may have been taken place for many weeks.

SUMMARY OF THE INVENTION

It is a primary object of the present invention to provide in a clutch-brake power transmitting device an adjusting mechanism which obviates the necessity for manual adjustment of the clutch brake clearance resulting from clutch brake wear.

Another object of this invention is to provide a self-adjusting clutch brake mechanism for maintaining optimum clearance throughout the life of the clutch-brake friction plates in a power transmitting device.

A further object of this invention is to provide an adjusting mechanism for clutch-brake power transmitting devices which will adjust the clutch brake clearance automatically when, because of wear, the clearance has become greater than a preselected value.

A still further object of the invention is to provide a self-adjusting clutch brake mechanism which will maintain the clutch-brake clearance within allowable limits and which is operable simultaneously with the transmission of power.

A yet still further object of this invention is to provide a self-adjusting means which is operable by the actuation of the power control lever in a power transmitting device of the clutch-brake type.

BRIEF DESCRIPTION OF THE DRAWINGS

These and other objects and advantages of the invention will become apparent from the following description taken in conjunction with the accompanying drawings, in which:

FIG. 3 is a cross sectional view taken substantially on line 3—3 of FIG. 1; and

FIG. 4 is a cross sectional view taken substantially on line 4—4 of FIG. 1.

DESCRIPTION OF THE PREFERRED EMBODIMENT

Figure 1:
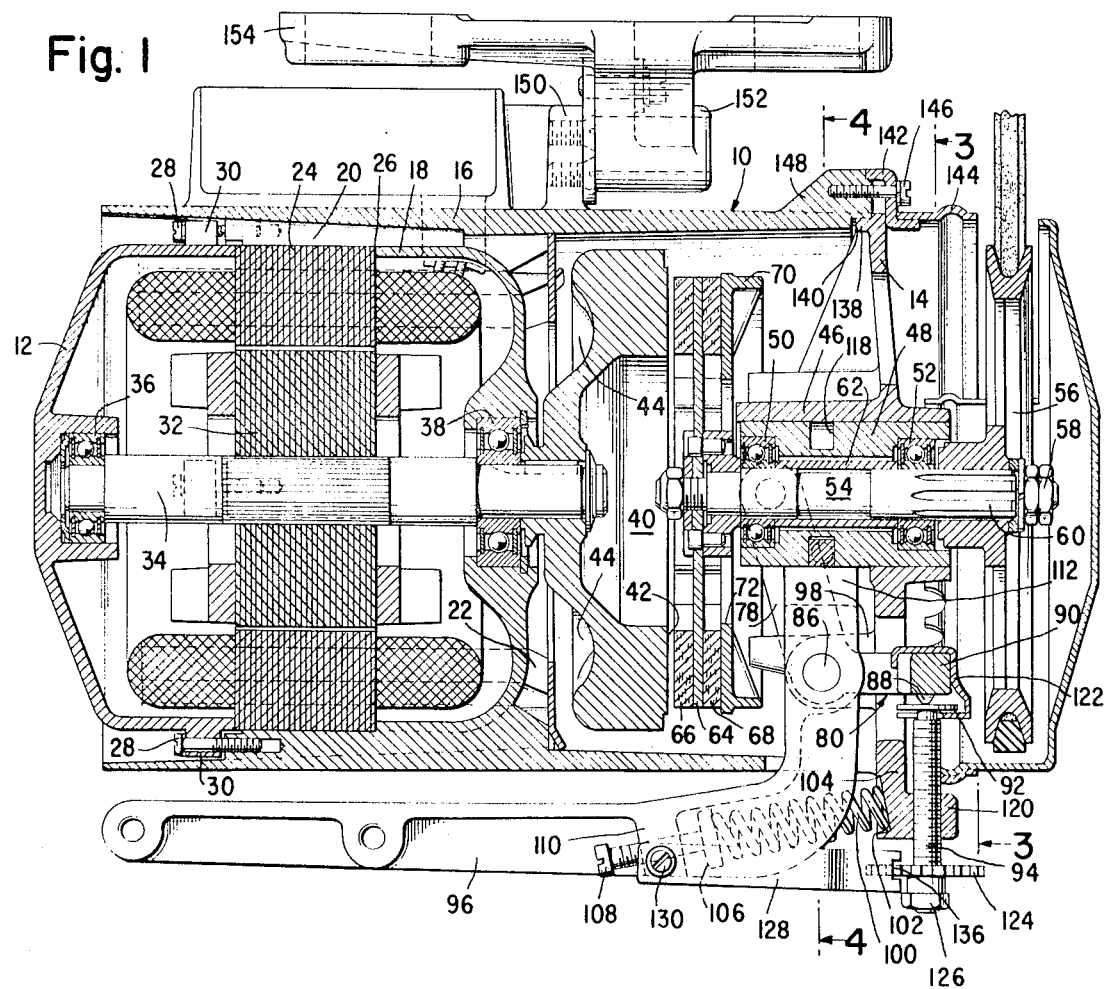
FIG. 1 is a longitudinal cross sectional view taken through a clutch-brake power transmitting device illustrating an embodiment of this invention.

Referring now to the accompanying drawings wherein like reference numerals denote similar parts there is disclosed a preferred embodiment of the present invention applied to a power transmitter of the type illustrated in the aforesaid U.S. Pat. No. 3,387,157. The device includes a housing comprising three main parts, a main frame 10, a motor-end closure 12, and a power output-end closure 14. The main frame 10 is formed with an outer cylindrical wall portion 16 and an inner cup-shaped portion 18 radially spaced from and coaxial with said outer portion, and supported from the outer portion 16 by circumferentially spaced ribs 20 and 22 integrally formed with both portions. A stator core 24 is coaxially guided by the ribs 20 and 22 to a seated position against an annular rib 26 formed by the end of the cup-shaped portion 18 and is held in this position by the motor-end closure member 12 by means of screws 28 passing through lugs 30 and threadedly received in the ribs 20. A rotor core 32 is secured to a rotor shaft 34 journaled at one end in a bearing 36 supported by the motor-end closure member 12, and journaled adjacent its other end in a bearing 38 supported by the cup-shaped portion 18. A substantially cup or bell-shaped imperforate flywheel 40 is fastened to the power output end of the rotor shaft and includes a clutch surface 42 on its power output facing end. Radial fan blades 44 are provided to circulate cooling air through the device as described in the aforesaid patent.

The power output-end closure member 14 is formed with a central tubular support 46 which rotatably and slidably carries a control sleeve 48. Two spaced ball bearings 50 and 52 are fitted into bores in opposite ends of the sleeve 48 and rotatably mount a driven power take-off shaft 54 which is rotatable relative to the sleeve 48 and slidable with the sleeve. The outer end of the shaft 54 carries a driven pulley assembly 56 which is secured by a nut 58 to the shaft. A spline 60 formed in the pulley end of the shaft prevents slipping of the pulley relative to the shaft while a spacer sleeve 62 extending between the inner races of the bearings 50 and 52 allows the nut 58 to be drawn up securely on the shaft without danger of damaging the bearings since the clamping action is transmitted directly between the inner races. A clutch disk 64 carrying friction facings 66 and 68 on either side thereof is fastened to the motor end of the power take-off shaft 54. A brake ring or yoke member 70 having an oblong central opening 72 circumscribes the shaft 54 and the control sleeve 48 so that these elements may pass freely therethrough. The brake ring includes a pair of spaced lugs 74—74 and 76—76 extending from its pulley facing surface at each side of the opening 72. In order to support the brake ring 70 a pair of apertured arms 78-78 of a bifurcated bellcrank lever 80 extends between each pair of lugs 74 and 76. A pin 82 passes through each lug 74, arm 78 and lug 76 to pivotably support the brake ring on the bellcrank lever. A friction washer 84 is mounted on each pin 82 between the arms 78 and either the lugs 74 (as shown) or 76 so that the motor-facing face of the brake ring may be positioned parallel to the friction facing 68 and not swing about freely on the pins 82. The position of the bellcrank lever 80, which itself pivots about a pin 86 secured to the power output end closure member 14, is determined by the location at which a tang 88, formed on the bottom of the free end 90 of the bellcrank lever, abuts a washer member 92 formed on a threaded stud member or screw 94 located in the power output enclosure member 14, as will be understood further from the description hereinafter.

An L-shaped clutch and brake actuating lever 96 is pivotably carried by the pin 86 which is supported in two bosses 98—98 formed in the power output-end closure member 14. A brake compression spring 100 seated in a depression 102 formed in a downwardly extending portion 104 of the power output end closure member 14 is received in a thrust cup 106 mounted on the end of an adjusting screw 108 threaded into a boss 110 formed on the actuating lever 96. The spring 100 urges the lever 96 in a clockwise direction about the pin 86, as viewed in FIG. 1. The lever 96 has a pair of bifurcated arms 112 formed on one end thereof and which carry a pin 114 that extends between them. The pin carries a substantially square shaped elongated block 116 which passes below the driven shaft 54 through a circumferential groove 118 formed in the slidable control sleeve 48. Actuation of the lever 96 about the pivot pin 86 thereby moves the sleeve 48 and the driven shaft 54 axially (toward the left in FIG. 1) in the tubular support member 46 to selectively engage the clutch disk friction facing 66 in driving relation with the flywheel 42 or the friction facing 68 in stopping relation with the brake ring 70.

When the driven clutch member 64 is positioned in the stop position with the face 68 engaging the brake 70, a clearance is defined between the facing 66 and the flywheel friction surface 42. As wear occurs this clearance increases and eventually reaches a point where actuation of the lever 96 results in a much greater travel of said lever. It should be noted that the free end of the lever 96 is generally connected to a treadle mechanism or pedal as disclosed in U.S. Pat. No. 2,822,903 to which further reference may be made for a complete understanding of a practical use of such a device. It thus becomes necessary to adjust this clearance into tolerable limits. To this end the threaded stud or screw 94 is threadedly received in a boss 120 formed on the pulley-end of the downward extension 104. A substantially U-shaped spring 122 maintains the arm 90 of the bellcrank lever 80 resiliently captive against the screw through the washer 92. It should be understood that by taking up on the adjusting screw 94 the bellcrank lever 80 is rotated counterclockwise about the pin 86, as viewed in FIG. 1 by the discrete angular amounts by the abutment of the screw with the arm 90. This action moves the brake yoke 70 toward the driving clutch surface 42 of the flywheel 40 in discrete amounts. Since the brake ring 70 is gimbaled on the pins 82 the first time, after an adjustment is made, that the clutch surface 68 engages the brake the brake will be turned to the correct angular relationship with the friction facing 68 so that full area contact is made between them and will remain in that position due to the lock washers 84.

Figure 2:
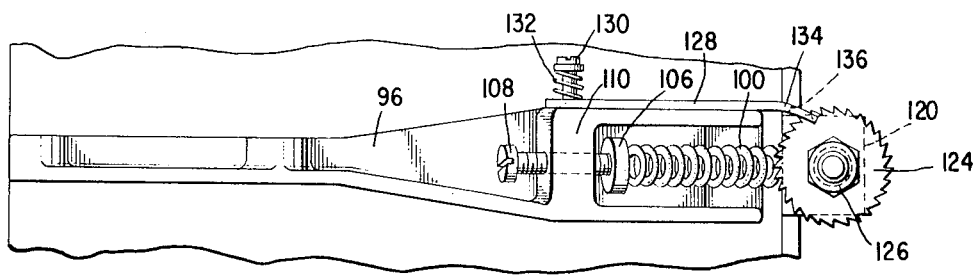
FIG. 2 is a bottom view of a portion of the device shown in FIG. 1 illustrating the self-adjusting actuating mechanism of the present invention.

To provide a self-adjusting feature, whereby the clearance between surface 42 and the facing 66 is always maintained within proper limits, the present invention provides a ratchet wheel 124 secured to the screw 94 by any convenient means, but shown in the drawings as a lock nut 126. In order to turn the ratchet wheel and thereby actuate the adjustment there is provided a pawl 128 which is secured to the lever 96 and movable therewith. In the preferred embodiment the pawl is secured to the lever 96 by means of a shoulder screw 130 mounted in the lever 94 and having a spring 132 acting against the shoulder and biasing the pawl against the lever. This arrangement allows a slight pivot action of the pawl as the lever 96 is pivoted to effect engagement of the facing 66 with the surface 42 of the flywheel and, thereby, allows the pawl to move upwardly (in FIG. 1) with the ratchet wheel as it rotates the same. The pawl 128 includes adjacent its free end a portion 134 which is bent toward the ratchet wheel 124 and includes at the free end a notch 136 which in the braking position of the lever 96 is positioned adjacent to the teeth of the ratchet wheel. When the lever 96 is pivoted to provide a driving relationship on the shaft 54 the pawl 128 engages at its notched portion 136 with a tooth of the ratchet. The ratchet teeth are obliquely angled such that the ratchet and screw 94 may only be rotated clockwise by the pawl, as seen in FIG. 2, thereby to reduce the clearance between facing 66 and surface 42. When the clutch brake clearance is within a desired dimension the pawl merely oscillates along one of the teeth but cannot move to the next tooth until additional wear of the clutch or brake friction material increases the clearance beyond allowable limits. When this occurs the pawl slips over the next tooth as the lever 96 returns to the braking position and on the next engagement of the lever to the driven position the pawl turns the ratchet and thereby reduces the clearance space. The pitch of the ratchet teeth obviously determines the clearance space. Thus, the ratchet pitch is proportional to the amount by which the spacing between the facing 66 and the surface 42 may be allowed to vary so that when the clearance space becomes greater than a preselected maximum value the actuation of the lever 96 will effect a turning of the ratchet 124 to thereby turn the screw 94 and reduce the clearance.

The power output-end enclosure member 14 is formed with a circumferential tongue 138 which fits into a rabbet 140 in the end of the main frame 10. Clamps 142 secured to a rim member 144 in equally spaced circumferential relation are removably secured to the frame 10 by means of screws 146 threaded into bosses 148 formed on the frame. A boss 150 is formed on the exterior of the frame 10 to which is secured a boss 152 of a mounting bracket 154 adapted to be secured to the underside of a sewing machine or the like powered table.

From the above description it will be apparent that there is provided according to this invention a power transmitting device having an automatic adjusting mechanism to compensate for wear which is simple and effective and which attains the above enunicated objects.

Numerous alterations of the structure herein disclosed will suggest themselves for those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

Having thus set forth the nature of the invention what is claimed is:

1. A power transmitting device comprising a rotatable shaft, a driving clutch member secured to said shaft for rotation therewith, a brake member spaced from said driving clutch member, a power take-off shaft, a driven clutch member secured to said take-off shaft for rotation therewith, said driven clutch member located intermediate said driving clutch member and said brake member, means including an actuating lever for moving said take-off shaft selectively to engage said driven clutch member with said driving clutch member or said brake member, when in engagement with said brake member said driven clutch member being spaced by a clearance from said driving clutch member, adjusting means for moving said brake member toward said driving clutch membr, and means operable by said actuating lever as said driven clutch member is moved to engage said driving clutch member for operating said adjusting means to reduce said clearance when it has increased beyond a preselected amount.

2. A power transmitting device as recited in claim 1 wherein said means for operating said adjusting means comprises a ratchet secured to said adjusting means, and a pawl mounted on said actuating lever and positioned for engaging the teeth of said ratchet when said lever is actuated.

3. A power transmitting device as recited in claim 1 wherein said adjusting means includes an adjusting screw, and means abutting said screw and operatively connected to said brake member to move said brake member in response to movements of said screw; said means for operating said adjusting means comprises a ratchet wheel secured to said screw, and a pawl mounted on said actuating lever and positioned adjacent the teeth of said ratchet wheel for engaging said teeth to turn said screw when the lever is actuated.

4. In a power transmitting device as recited in claim 1 including a frame for supporting said power take-off shaft, means for pivotably mounting said actuating lever on said frame; said adjusting means including a bellcrank lever, means for pivotably mounting a first end of said bellcrank lever to said brake member, an adjusting screw threadedly mounted in said frame and abutting a second end of said bellcrank lever, and means for pivotably mounting said bellcrank lever to said frame intermediate said first and second ends; said means for operating said adjusting means comprises a ratchet wheel secured to said screw, and a pawl mounted on said actuating lever and positioned adjacent the teeth of said ratchet wheel for engaging said teeth to thereby turn said screw as the lever is pivoted for engaging the driven clutch member with the driving clutch member.

5. In a power transmitting device as recited in claim 4 wherein the pitch of the ratchet teeth is proportional to the preselected amount by which the clearance may vary.

6. A power transmitting device comprising a housing, a power driven shaft rotatably mounted in said housing, a driving clutch member secured to said shaft for rotation therewith, a brake member supported in said housing spaced from said driving clutch member, a control sleeve slidably mounted in said housing, a power take-off shaft rotatably mounted in said sleeve and slidable therewith, a driven clutch member secured to said power take-off shaft for rotation therewith and located intermediate said brake member and said driving clutch member, an actuating lever pivotably mounted on said housing and operatively connected to said control sleeve for moving said takeoff shaft selectively to engage said driven clutch member with said driving clutch member or said brake member, a clearance space being defined between said driven clutch member and said driving clutch member when said driven clutch member is in engagement with said brake member, adjusting means for moving said brake member in discrete amounts toward said driving clutch member to reduce said clearance space, and adjustment actuating means actuated by said actuating lever for operating said adjusting means when said lever is pivoted.

7. A power transmitting device as recited in claim 6 wherein said adjusting means includes a brake moving member, means for pivotably mounting said brake member to said brake moving member, and an adjusting screw threadedly mounted in said housing abutting said brake moving member.

8. A power transmitting device as recited in claim 7 wherein said adjusting actuating means comprises one way drive means.

9. A power transmitting device as recited in claim 7 wherein said adjustment actuating means comprises a ratchet wheel secured to said screw, a pawl mounted on said actuating lever, said pawl being positioned adjacent the teeth of said ratchet wheel when said driven clutch member is engaged with said brake member and contacting a tooth of said ratchet wheel when said driven clutch member is engaged with said driving clutch member.

10. A power transmitting device as recited in claim 9 wherein the pitch of the teeth of said ratchet is proportional to a preselected value of said clearance space whereby said pawl acts on said tooth to turn the ratchet wheel when the clearance space becomes greater than said preselected value.

11. A power transmitting device as recited in claim 6 wherein said adjusting means comprises a bellcrank lever, means for pivotably mounting said brake member to a first end of said bellcrank lever, an adjusting screw threadedly received in said housing abutting a second end of said bellcrank lever, and means for pivotably mounting said bellcrank lever in said housing intermediate said first and second ends.

12. A power transmitting device as recited in claim 11 wherein said adjustment actuating means comprises a ratchet wheel secured to said screw, a pawl mounted on said actuating lever, said pawl being positioned adjacent the teeth of said ratchet wheel when said driven clutch member is engaged with said brake member and contacting a tooth of said ratchet wheel when said driven clutch member is engaged with said driving clutch member.

* * * * *